Oct. 4, 1927.
W. MILLER
DENTAL FLOSS HOLDER
Filed March 24, 1927
1,644,390
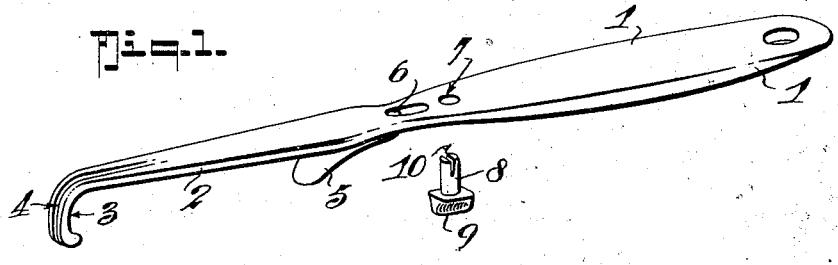
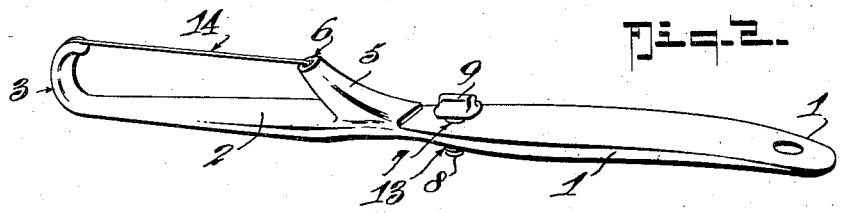
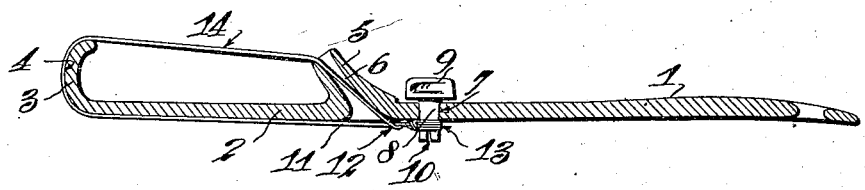
INVENTOR
Wm. Miller.
BY
Albert F. Dieterich
ATTORNEY Patented Oct. 4, 1927.

1,644,390

UNITED STATES PATENT OFFICE.

WILLIAM MILLER, OF PORTLAND, OREGON.

DENTAL-FLOSS HOLDER.

Application filed March 24, 1927. Serial No. 178,025.

The invention primarily has for its object to provide a dental floss holder of a size and shape for facilitating convenient and practical use of the dental floss held thereby in cleaning between the teeth of the user even in the most inaccessible places, means being provided to properly hold the floss to accomplish that object and in a desired and suitable degree of tautness.

I am aware that dental floss holders of varied structure have heretofore been produced, but all of those of which I have knowledge are impractical or undesirable because of their inconvenient shape, making it difficult and in some cases impossible to reach all of the tooth spaces, because of ineffective and non-adjustable tensioning devices, or because of the material necessary to be used in their construction, causing them to be insanitary or undesirable in that they include metal parts which engage the mouth and which sometimes become loose and are lost.

Therefore, in its more detailed nature, the invention resides in the provision of a sanitary substantially single piece dental floss holder shaped in a manner and adapted for holding the floss in a position for rendering all tooth spaces easily and conveniently accessible, and in which means is provided for tensioning the floss according to the desire of the user.

The invention still further resides in the novel details of construction, combination and arrangement of parts, all of which will be first fully described, then be particularly pointed out in the appended claims, reference being had to the accompanying drawing, in which:—

Figure 1 is a perspective view of the holder, the floss being removed and the tensioning key being shown separated.

Figure 2 is a perspective view of the device equipped for use.

Figure 3 is a central longitudinal section of the device.

In the practical development of my invention I provide a handle portion 1 which is extended in a longitudinal line to form a body portion 2 which terminates in an upwardly turned hook-shaped end 3.

It will be observed by reference to Figures 1 and 3 of the drawing that the outside surface of the hook shaped end 3 and the adjacent portion of the body 2 are provided with a dental floss receiving groove 4 of a depth substantially equal to or slightly more than the thickness of the dental floss.

Inwardly of its end and adjacent its juncture with the handle portion the body portion has an upward forward extension or eye 5 having a floss passage bore 6 therethrough and extending upwardly forwardly in the general direction of the hook shaped end.

Just beyond the upstanding eye 5 and adjacent the rearmost terminus of the bore 6 the handle portion is provided with a cross bore 7 adapted to frictionally receive the shank 8 of the tensioning key 9, the said shank being equipped with a floss ends receiving notch 10, the purpose for which will presently appear. A length of the floss is indicated at 11.

To utilize the device for its intended purpose it is only necessary to take a length of approximately eight inches of dental floss, thread one end thereof through the bore 6 and hold the same adjacent the tensioning key, pass the other end around the hook 3 in the groove 4 and then twist the free ends of the floss as at 12 by simply rolling them between the forefinger and thumb and insert them into the clamp notch 10 of the tensioning key. By rotating the key in either direction the twisted ends of the floss will be caused to wind around the shank, as at 13, so as to tension the operative portion 14 of the floss extending between the foremost end of the eye 5 and the hook shaped end 3 in any desired degree.

The holder is now ready for use. After proper use has been made of the device the floss may readily be removed and the holder suitably washed, after which a new floss may be mounted upon the holder so as to be ready for the next use. In this replacement, however, it is best not to tension the floss but merely to mount the same so that it may be tensioned just before use and in the degree desirable.

By constructing the device as hereinbefore described, it is possible to use any type of dental floss now commonly sold in the trade since the device does not include a particular construction of floss spool reservoir. The supply of floss may be kept in a separate container and it is only necessary to remove a length sufficient to be used upon the holder from that supply when it is desired to use the device. This is an advantage because in the holders now commonly used it is usually possible to use but a single type of floss, one that is sold in a container suitable for being carried by the particular type of holder.

In the foregoing description, taken in connection with the accompanying drawing, I have disclosed a simple and efficient dental floss holder in which none of the objectional features of improper suspension of the floss, rendering inaccessible the reaching of some teeth, undesirable structural features from a sanitary standpoint or inability to properly tension the floss are present.

From the foregoing description, taken in connection with the accompanying drawing, it is thought the complete construction, operation and advantages of my invention will be clear to those skilled in the art to which it relates.

What I claim is:

1. A device of the class described, comprising a handle portion, a body portion extending from the handle portion and terminating in a hook shaped end, an eye upstanding from the body inwardly of said end and cooperative with said end in suspending a length of dental floss in position for use, said eye having a floss passing bore therethrough, a frictionally held turning key, and a length of dental floss having one end passed around the hook shaped end and its other end passed through the said bore and both ends wound on the friction key for the purpose described.

2. A device of the class described comprising a handle portion, a body portion extending lengthwise from the handle portion and terminating in a hook shaped end, an eye extending upwardly from the body portion in the direction of said hook shaped end and having a floss passing bore therethrough, part of said body portion and said hook shaped end on its outside surface being provided with a floss receiving groove, a turning key frictionally rotatably mounted in the handle portion just beyond the eye bore and having a floss clamping notch, and a length of floss laid in the groove and having one end passed over the hook shaped end and through the eye bore and the other end lying along the body portion and both ends clamped in the key notch and wound about the key for the purpose described.

3. A device of the class described, comprising a handle portion, a body portion integral with and extending from the handle portion and terminating in a hook shaped end, an eye upstanding from the body inwardly of said end and cooperative with said end in suspending a length of dental floss in position for use, said eye having a floss passing bore therethrough, a length of dental floss having one end passed around the hook shaped end and its other end passed through the said bore, and means to secure the ends of said floss to said handle portion.

WILLIAM MILLER.